United States Patent [19]

Behrendt

[11] 4,252,288
[45] Feb. 24, 1981

[54] HOLDER FOR FUSES OR THE LIKE

[75] Inventor: Martin Behrendt, Hagen, Fed. Rep. of Germany

[73] Assignee: Wickmann-Werke AG, Fed. Rep. of Germany

[21] Appl. No.: 5,776

[22] Filed: Jan. 23, 1979

[30] Foreign Application Priority Data

Dec. 20, 1978 [DE] Fed. Rep. of Germany ....... 2854966

[51] Int. Cl.³ ................................................ G12B 9/00
[52] U.S. Cl. ..................................... 248/27.1; 362/456
[58] Field of Search ............................ 248/27.1, 27.3; 362/456, 311; 399/128, 129; 200/296; 24/73 AS;256

[56] References Cited

U.S. PATENT DOCUMENTS

| 353,867 | 12/1886 | Kitchen | 362/456 X |
| 1,179,392 | 4/1916 | Bambeck | 362/456 |
| 1,400,155 | 12/1921 | Greenburg | 248/27.3 X |
| 1,933,633 | 11/1933 | Luce | 362/456 X |
| 2,038,656 | 4/1936 | Henrikson | 248/27.1 X |
| 2,076,043 | 4/1937 | Ryder | 248/27.1 X |
| 2,165,835 | 7/1939 | Brady et al. | 362/456 |
| 3,697,025 | 10/1972 | Edwards | 248/27.3 |
| 3,845,925 | 11/1974 | Edwards | 248/27.1 |

*Primary Examiner*—J. Franklin Foss
*Attorney, Agent, or Firm*—Robert E. Burns; Emmanuel J. Lobato; Bruce L. Adams

[57] ABSTRACT

A holder for a fuse or the like of the type which is insertable into a hole in a mounting plate and fastened to the mounting plate comprises an elongate housing dimensioned to be axially inserted in the hole in the mounting plate and having at one end a flange portion which abuts the mounting plate upon full insertion of the housing in the hole. A resiliently deformable sleeve is mounted on the housing adjacent the flange portion and the sleeve has an outer diameter slightly greater than that of the mounting plate hole. During insertion of the housing in the mounting plate hole, the sleeve makes sliding contact with the wall of the hole thereby causing inward deformation of the sleeve to an extent sufficient to cause the sleeve to exert radially outward pressure against the wall of the hole to thereby frictionally fasten the holder to the mounting plate. The sleeve has sufficient resilience to enable it to be radially inwardly compressed in response to insertion of the housing in the mounting plate hole so that the holder can be quickly fastened to the mounting plate by simply inserting the holder housing in the mounting plate hole.

17 Claims, 9 Drawing Figures

HOLDER FOR FUSES OR THE LIKE

The invention relates to a holder for fuses or the like comprising an elongate housing which can be inserted in a hole in a mounting plate.

To secure the housing of a fuse holder against axial movement in the hole in the mounting plate, it has previously been proposed to provide a flange overlapping the hole on one side of the plate and, on the other side, to screw a sleeve nut on a threaded section of the housing until it abuts the other side of the mounting plate. Protection against twisting is usually obtained by making the hole D-shaped and correspondingly shaping the part of the housing engaging with the D-hole in the final position of the holder, or, alternatively, by engagement of a nose on the overlapping flange of the housing in a corresponding recess or groove in the hole in the mounting plate.

The holder can be securely fastened to the mounting plate by sleeve nuts or the like but the work necessary to do this is time-wasting and cumbersome, especially when the space available on the other side of the mounting plate is small.

Attempts have been made to secure the housing of the holder in such a way that mounting of fastening means on the other side of the mounting plate is dispensed with. For example, at two points lying opposite one another on the housing, small lobes have been provided which serve as locking elements engaging behind the mounting plate. In order that the lobes, upon passing through the hole, are sufficiently elastic to be elastically deflected radially inwardly and to spring back into the original position after having passed through, the housing and the added lobes are produced from a thermoplastic material. The housing of the holder can thus be forced into the hole and after which the lobes prevent the housing from slipping out without additional securing means being needed. However, it has been found that the thermoplastic material necessary for the operation of the lobes as locking-parts, because of the heat frequently arising in the apparatus, is an unsuitable material for the housing of the holder. Furthermore, fastening by only two lobes engaging behind the mounting plate is not secure enough, especially since the security of the fastening depends upon the thickness of the wall of the mounting plate, and the only engagement between the wall of the hole and the lobes is at the inner edge of the wall of the hole and there is substantially no pressure between the hole wall and the housing. Moreover, upon heating of the housing and the lobes, the elastic restoring force which holds part of each lobe in contact with the wall of the hole also relaxes. Strengthening the lobes or providing a larger number of lobes does not help because too high a pressure is then required to insert the housing into the hole.

In accordance with the invention a holder for a fuse or the like comprises an elongate housing which, in use, is inserted in a hole in a mounting plate, one end of the housing having a flange portion which, in use, abuts the mounting plate to prevent axial movement of the holder in one direction. The holder is non-rotatably held in the mounting plate and a resilient, part-annular sleeve is mounted on the housing adjacent to the flange portion and secured against axial movement along the housing so that upon insertion of the housing into the hole, the sleeve engages the hole wall and is compressed radially inwardly, the resilience of the sleeve causing it to grip the mounting plate. Thus the gripping of the hole wall by the sleeve prevents any unintentional pulling of the holder out of the hole.

The annular sleeve may be produced in a simple way from a spring steel sheet.

Preferably, the sleeve is secured against axial movement along the housing by the flange and a radial projection on the housing spaced from the flange.

The radial projection may, if the housing has an external screw-threaded portion, comprise one of the turns of the screw thread against which a radially inwardly extending edge of the sleeve abuts.

Alternatively, if there is no external screw thread, some other radial projection may be provided which may be integral with the housing.

Preferably, the sleeve is formed in the shape of a part annular ring. It may then be prestressed axially on the housing. In this case the sleeve is secured on the housing before the fuseholder is fitted into the mounting plate.

It is particularly useful if the sleeve comprises a strip of spring sheet metal formed into the shape of a part annular ring, the edges of which are bent inwards. The inturned edges support the sleeve on the housing and allow it to be radially compressed.

In another example the sleeve may have a radially outward bulge between its edges. In this case it is convenient if bulging of the sleeve decreases more sharply towards the edge remote from the flange than in a direction towards the edge next to the flange. Also, the housing is held more securely in the hole as a consequence of deformation of the bulged sleeve as it contacts the edge of the hole.

It is particularly convenient if the outwardly bulged sleeve has slits at its edge adjacent to the flange, as such improves the capability of the sleeve to adapt to the hole wall and the housing is more securely held. The slits should extend generally axially.

Alternatively, a number of tangs may be bent out from the sleeve, the tangs extending towards the flange and being set at different distances from the edge of the sleeve adjacent the flange. By this means the holding action of the sleeve is reinforced, because apart from the friction grip between the sleeve and the wall of the hole, a positive grip is obtained between the tangs and the other side of the mounting plate. If strips are provided at different distances from the edge adjacent the flange, the sleeve may be used to secure housings in mounting plate of different thicknesses. In order to make optimum use of the tangs, some may be arranged to lie at substantially equal distances away from the edge of the sleeve adjacent to the flange and around the periphery of the sleeve in such a way that they lie substantially diametrically opposite one another.

In some examples, the portion of the housing adjacent the flange upon which the sleeve is mounted, may taper towards the radial projection.

To prevent the sleeve from twisting or turning on the housing, it is useful if the ends of the sleeve are bent over and overlap a flattened portion of the housing. In this case, if the flattened portion is used to prevent rotation of the housing in the D-hole in the mounting plate, the bent over edges of the sleeve may be received in short steps formed in the flattened portion.

Alternatively, the edges of the sleeve may lie substantially flush with a flattened portion of the housing. In this case twisting is prevented because the sleeve cannot be shifted into the spaces between the flattening and the D-hole in the mounting plate.

Some examples of a fuse holder in accordance with the invention will now be described with reference to the accompanying drawings, in which.

Figures 1, 2:
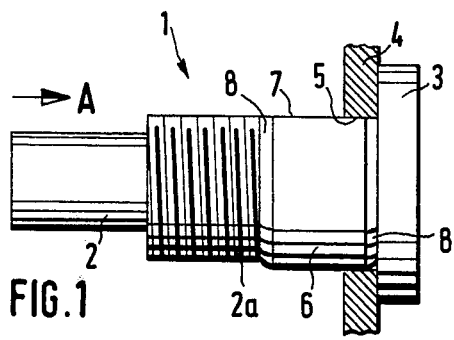
FIG. 1 is a side elevation of a fuse holder fastened in a mounting plate.
FIG. 2 is an end elevation taken in the direction of the arrow A in FIG. 1.

The fuse holder shown in FIGS. 1 and 2 comprises an elongate housing 1 having a shank 2 with a screw-threaded section 2a and a flange 3. A fuse (not shown) lies along the axis of the holder.

The housing 1 is fastened in a hole 5 in a mounting plate 4 by a part annular sleeve 6 which is mounted between the threaded section 2a and the flange 3. The housing 1 is forced into the hole 5 until the flange 3 abuts the mounting plate 4. Upon insertion of the housing 1 in the hole 5, the sleeve 6, which has an outer diameter greater than that of the hole 5, engages the hole wall and is resiliently deformed and compressed radially inwardly, the resilience of the sleeve causing it to frictionally grip the mounting plate 4 and to secure the housing 1 in the mounting plate. Thus in response to insertion of the housing 1 in the mounting plate hole 5, the resilient sleeve 6 resiliently deforms radially inwardly due to sliding contact with the wall of the hole and the inward deformation is sufficient to cause the sleeve to exert radially outward pressure against the wall of the hole to frictionally fasten the holder to the mounting plate.

To prevent the housing 1 from twisting in the hole 5, the hole 5 is formed, in the usual way, as a D-hole and the housing 1 has a corresponding flattened portion 7.

Figures 3, 4:
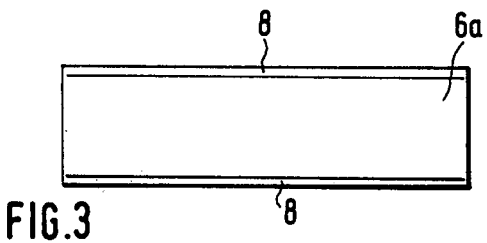
FIG. 3 is a plan view of a sleeve prior to being formed into a part annular ring.
FIG. 4 is a side elevation of the sleeve in FIG. 3.

The sleeve 6 comprises resiliently deformable means which may be formed from a spring sheet metal portion 6a with edges 8 bent inwards as shown in FIGS. 3 and 4. The portion 6a is bent into the shape of a ring having a smaller diameter than that of the section 2a of the shank 2 so that it may be securely mounted on the housing 1. As shown in FIG. 1, one of the edges 8 abuts the flange 3, while the edge 8 remote from the flange 3 engages with a radial projection which, in this example, comprises one of the turns of the screw threaded section 2a, so that the sleeve 6 is secured to the housing 1 in both axial directions and is thus prevented from undergoing axial movement on the housing. Also, the inturned edges 8 maintain a slight clearance of the wall of the sleeve from the threaded section 2a, to allow the sleeve to be radially compressed. Twisting or turning between the sleeve 6 and the housing 1 is prevented by abutment of the short edges 9 of the sleeve 6 against the flattened part of the hole 5.

Figures 5, 7:
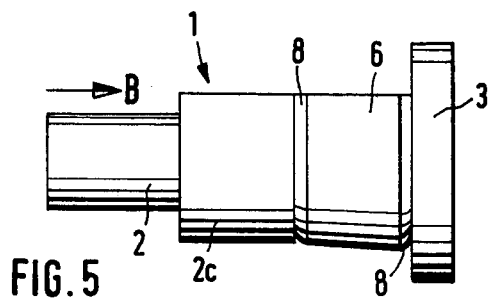
FIG. 5 is a view similar to FIG. 1 but of a second example.
FIG. 7 is an end elevation taken in the direction of the arrow B in FIG. 5.
Figure 6:
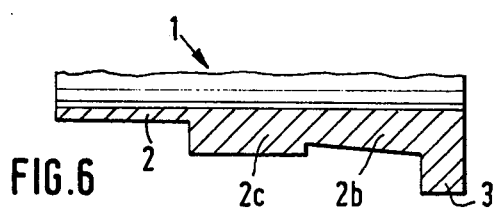
FIG. 6 is a section through part of the holder shown in FIG. 5.

The example illustrated in FIGS. 5-7 differs from the example described above in that the threaded section 2a of the shank 2 is replaced by a tapered section 2b and an integrally formed radial projection 2c adjoining it. The sleeve 6 consequently takes up a shape corresponding to the taper of the section 2b.

Figures 8, 9:
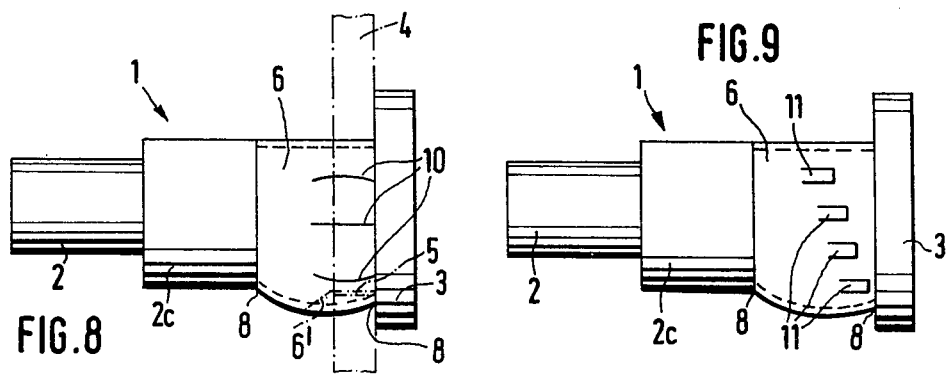
FIG. 8 is a view similar to FIG. 1 but of a third example.
FIG. 9 is a view similar to FIG. 1 but of a fourth example.

In the examples shown in FIGS. 8 and 9, the sleeve 6 is bulged relatively strongly radially outwards and is secured against axial movement between the flange 3 and the projection 2c. The additional bulge of the sleeve 6 allows the sleeve to grip more firmly the hole 5 as shown in dash-dot line in FIG. 8. The line 6' indicates the approximate shape of the sleeve 6 after the housing 1 has been forced into the hole 5. As may be seen, the bulging of the sleeve 6 decreases more sharply towards the edge 8 remote from the flange 3 than in the direction towards the edge 8 adjacent the flange.

Slits 10 are provided in the sleeve 6 to improve the ability of the sleeve 6 to adapt its shape to that of the hole 5.

In the example shown in FIG. 9, tangs 11, situated at different distances from the flange 3, are punched out of the periphery of the sleeve 6 and bent slightly outwards. These tangs 11 increase the frictional connection between the sleeve 6 and the wall of the hole 5 generated by the radial spring force of the tangs. Upon insertion of the housing 1 into the hole 5, the tangs 11 deflect inwards and, after passing through the hole 5, spring back into their original position. Those tangs 11 which spring back just when the flange 3 comes into contact with the mounting plate 4 engage behind the mounting plate 4 and fasten positively the holder in the hole 5.

I claim:

1. A holder for a fuse or the like adapted to be non-rotatably mounted on a mounting plate of the type having a hole in which said holder is adapted to be inserted, said holder comprising: a housing having a flange portion at one end configured to abut said mounting plate to prevent movement of said holder in a first axial direction; and a resilient, part-annular sleeve having an outer diameter greater than that of the hole and mounted on said housing adjacent to said flange portion and secured against axial movement along said housing by said flange portion and a radial porjection on said housing spaced from said flange portion and integral with said housing so that upon insertion of the housing-and-sleeve assembly into said hole said sleeve engages the wall of said hole and is compressed radially inwardly such that the resilience and radial spring force of said sleeve causes it to grip said wall of said mounting plate with sufficient frictional connection between the sleeve and the wall of the hole to thereby secure said housing to said mounting plate.

2. A holder according to claim 1; wherein part of said housing is screw threaded and said radial projection comprises one of the turns of said screw thread, a radially inwardly extending edge of said sleeve abutting said one turn.

3. A holder according to claim 1; wherein the portion of said housing adjacent to said flange portion upon which said sleeve is mounted tapers towards said radial projection.

4. A holder according to claim 1; in which said sleeve is prestressed axially on said housing.

5. A holder according to claim 1; wherein said sleeve comprises a strip of spring sheet metal formed into the shape of a part-annular ring.

6. A holder according to claim 1; wherein said sleeve has a radially outward bulge between its edges.

7. A holder according to claim 6; wherein slits are provided in said sleeve at its edge adjacent to said flange portion, said slits extending generally axially.

8. A holder according to claim 6; wherein a plurality of tangs are bent out from said sleeve, the tangs extending towards said flange portion and set at different distances from the edge of said sleeve adjacent said flange portion.

9. A holder according to claim 8; wherein pairs of said tangs lie at substantially equal distances from said edge of said sleeve adjacent to said flange portion, said tangs of each of said pairs lying substantially diametrically opposite one another.

10. A holder according to claim 1; wherein said housing has a flattened portion, and said sleeve comprises a pair of ends, wherein said ends of said sleeve are bent over and overlap said flattened portion of said housing to prevent rotation of said sleeve relative to said housing.

11. A holder according to claim 1; wherein said housing has a flattened portion, and said sleeve comprises a pair of ends, wherein said ends of said sleeve lie substantially flush with said flattened portion of said housing.

12. A quick-fastening holder for a fuse or the like of the type which is insertable into a hole in a mounting plate and fastened to the mounting plate, said holder comprising: an elongate housing for a fuse or the like and having a flange portion at one end, said housing being dimensioned to be axially inserted in the hole in the mounting plate and said flange portion being dimensioned to abut the mounting plate during the course of insertion of the housing in the hole to thereby determine the extent of insertion of the housing in the mounting plate hole; and resiliently deformable means mounted on said housing adjacent said flange portion and having an outer diameter greater than that of the mounting plate hole for resiliently deforming radially inwardly in response to insertion of said housing in the mounting plate hole to an extent sufficient that the radially outward pressure exerted by said resiliently deformable means against the wall of the mounting plate hole effectively fastens by frictional engagement the holder to the mounting plate; whereby the holder can be quickly fastened to the mounting plate by simply inserting the holder in the mounting plate hole.

13. A quick-fastening holder according to claim 12; wherein said resiliently deformable means comprises a resiliently deformable sleeve mounted on said housing and dimensioned to undergo radially inward resilient deformation during insertion of said housing in the mounting plate hole.

14. A quick-fastening holder according to claim 13; including means for preventing axial movement of said sleeve on said housing.

15. A quick-fastening holder according to claim 14; wherein said means for preventing axial movement of said sleeve comprises a radially extending projection on said housing, and said flange portion of said housing, said sleeve being mounted on said housing interposed between and engaging said radially extending projection and said flange portion.

16. A quick-fastening holder according to claim 13; including means for preventing turning of said sleeve on said housing.

17. A quick-fastening holder according to claim 16; wherein said means for preventing turning of said sleeve on said housing comprises a flattened portion of said housing, and means on said sleeve engaging with the housing flattened portion to thereby prevent relative turning between said sleeve and housing.

* * * * *